United States Patent [19]

Bouvier d'Ivoire et al.

[11] 4,302,836

[45] Nov. 24, 1981

[54] MONITORING CIRCUIT FOR TIME-DIVISION SWITCHING NETWORK

[75] Inventors: Jean-Baptiste B. F. Bouvier d'Ivoire, Ville D'Avray; Michel J. B. Cauhape, Noisy le Roi; Jean-Paul Lager, Bougival, all of France

[73] Assignee: Le Materiel Telephonique Thomson-CSF, Colombes, France

[21] Appl. No.: 96,134

[22] Filed: Nov. 20, 1979

[30] Foreign Application Priority Data

Nov. 22, 1978 [FR] France ............................ 78 32905

[51] Int. Cl.³ .............................................. H04J 3/14
[52] U.S. Cl. ........................................ 370/13; 370/14
[58] Field of Search .......................... 370/13, 14, 58; 179/175.2 R

[56] References Cited

U.S. PATENT DOCUMENTS

| | | | |
|---|---|---|---|
| 3,937,935 | 2/1976 | Le Pabic | 370/13 |
| 3,980,833 | 9/1976 | Calcagno et al. | 370/58 |
| 4,163,122 | 7/1979 | de Goede | 370/13 |
| 4,208,552 | 6/1980 | Castriotta et al. | 370/13 |

Primary Examiner—Douglas W. Olms
Attorney, Agent, or Firm—Roland Plottel

[57] ABSTRACT

A circuit for monitoring the operation of a time-division switching network, in particular, a circuit for checking the continuity of the switching network speech paths during actual communications.

The circuit includes a plurality of monitoring Groups (I, II . . . N) which operate simultaneously under the control of a microprocessor. Each monitoring group is connected to all the incoming trunks via a synchronization and multiplexing circuit and to selected ones of the outgoing trunks, via a multiplexing circuit.

The invention is applicable to telephone exchanges.

14 Claims, 2 Drawing Figures

4,302,836

MONITORING CIRCUIT FOR TIME-DIVISION SWITCHING NETWORK

FIELD OF THE INVENTION

Broadly speaking, this invention relates to methods and apparatus for monitoring the operation of a time-division switching network. More particularly, in a preferred embodiment, this invention relates to methods and apparatus for monitoring the continuity of the speech paths established through a time-division switching network.

DISCUSSION OF THE PRIOR ART

As is well known, a time-division switching network allows interconnection of time-multiplexed communication channels between incoming trunks and outgoing trunks. The switching network typically includes a processor for producing correspondence data to determine the connection of an incoming trunk with an outgoing trunk.

There are known devices of this type which have a memory circuit for storing the correspondence data obtained from the processor, and sample acquisition circuits for feeding a comparator circuit with the channel data, before and after passage of the data through the network.

The main disadvantage of such devices is that the time required to monitor all of the paths which are established through the network increases with the size of the network.

SUMMARY OF THE INVENTION

As a solution to these and other problems, the instant invention proposes a circuit in which the monitoring time is short and independent of the network size.

According to one aspect of the invention, the circuit includes several monitoring groups, each of which is connected to all of the incoming trunks via a synchronization and multiplexing circuit and to selected ones of the outgoing trunks, via a multiplexing circuit.

According to another aspect of the invention, the check groups operate simultaneously under the control of a microprocessor which is connected to the processor, via data queues.

According to another aspect of the invention, the circuit makes it possible to perform tests in an autonomous mode, i.e. all the paths which are established through the network are tested without any processor intervention, or when requested by the processor, for example, when testing a path whose switching coordinates are defined by the processor.

According to another aspect of the invention, a self-test circuit monitors the circuit periodically or when ordered by the processor.

The purposes and operation of the present invention will be more fully understood from the following detailed description of an illustrative embodiment when taken with the drawings appended hereto, in which:

DETAILED DESCRIPTION OF THE INVENTION

Figure 1:
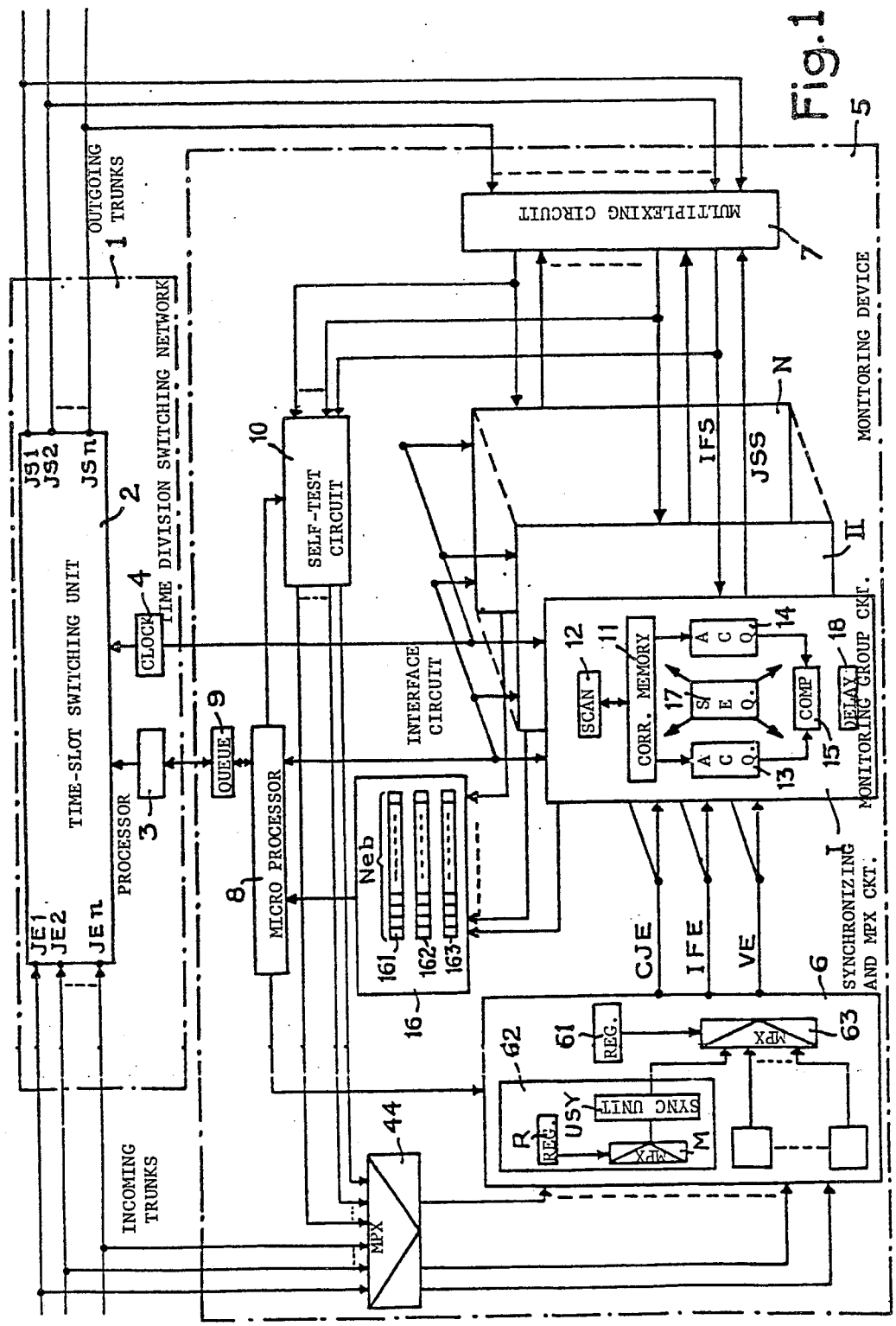
FIG. 1 represents the entire monitoring device and its functional with respect to the overall switching network.

In FIG. 1, the switching network 1 whose operation is to be checked includes a time-slot switching unit 2 which interconnects a plurality of communication channels, e.g. via incoming trunks JE1, JE2, ... JEn and outgoing trunks JS1, JS2 ... JSn.

In order to control switching unit 2, switching network 1 includes a processor 3 which provides the data indicating the correspondence between an incoming trunk and an outgoing trunk channel. Since the of both the incoming trunks and the outgoing trunks are identified by addresses, the processor provides the two addresses indicating the channels to be interconnected. In the channel addresses, the most significant bits indicate the trunk address, whilst the least significant bits indicate the channel address within this trunk. Operations within the network are executed at a rate which is determined by a clock 4.

Conventionally, a network control unit always includes two processors and in practice, a monitoring device in accordance with the invention, will also be duplicated, as are all telephone peripherals, each of the processors controlling one of the monitoring devices however, to simplify the description that follows. FIG. 1 shows only a single processor 3 and a single monitoring device 5.

The monitoring device 5 includes a microprocessor 8 which is connected to processor 3 via a plurality of data queues 9. In accordance with the invention, monitoring device 5 comprises N monitoring groups I, II ... N; each of which is connected to a group of incoming trunks, via a synchronization and multiplexing circuit 6.

The synchronization circuit 6 includes a register 61 written into by microprocessor 8 and containing the complete address, CJE, of the incoming trunk for which a scanning operation is being executed.

The synchronization circuit 6 also includes several synchronization and multiplexing groups, such as 62, each having a register R written into by microprocessor 8 and controlling a multiplexer M which is fed with some of the incoming trunks and which feeds a single trunk to the synchronization unit USY, of a known type.

The outputs of all the synchronization units are connected to the inputs of a multiplexer 63, which is controlled by the most significant bits of the address CJE contained in register 61, enabling the output signals of each synchronization group to be selected in turn in a cyclic manner. The least significant bits of address CJE are identical with the bits contained in register R of the synchronization group, whose output is selected by multiplexer 63.

Circuit 6 overcomes the autonomous check of the synchronization time by independently using the various synchronization groups, since whilst the tests relating to a synchronized incoming trunk are being executed, the following incoming trunks are being synchronized by the other synchronization units. This method saves time since the synchronization groups operate in parallel, and a synchronized trunk is always available on the output of circuit 6 without having to wait.

Circuit 6 simultaneously feeds to each of the monitoring groups the data IFE contained in a channel, designated by the term sample, the bits of this sample being produced in parallel, the address VE of the channel from which the sample is obtained and the address CJE of the synchronized trunk to which this channel belongs.

Each monitoring group I to N is connected to some of the outgoing trunks, via a multiplexing circuit 7, which feeds in series to each of the groups the data IFS contained in a trunk and which, therefore, simultaneously feeds to all the groups the data contained in N trunks. Circuit 7 receives from each group the address JSS of the trunk to be selected for this group, at a given instant.

The monitoring groups communicate with the microprocessor 8 via an interface circuit 16. Interface 16 consists of three N-bit status registers 161, 162 and 163, but i in each register being assigned to the monitor group i. Three status registers are regularly read by the microprocessor.

Finally, monitoring device 5 also includes a self-test circuit 10 fed with data IFS from circuit 7 and which, after reshaping the data, applies it to the input of circuit 6, via a group of multiplexers 44.

Circuits 6, 10, 44 and monitoring group circuits I to N operate under the control of microprocessor 8. Each of the monitoring groups, such as group I, possesses a correspondence memory 11, in which is stored the correspondence data produced by the processor and relating to the outgoing trunks connected to the group concerned. This memory 11 is scanned by means of a logic scan circuit 12 and provides each of the acquisition circuits 13 and 14 which the addresses of the incoming and outgoing channels respectively, in which the samples are obtained. The acquisition circuits 13 and 14 receive the samples from circuits 6 and 7 respectively, and feed the selected samples to a comparison circuit 15.

Each monitoring group includes a sequencer 17 comprising a microprogrammed logic circuit whose purpose is to control the execution of the various scan, acquisition and comparison phases, during operation of the device in the autonomous mode.

Finally, each monitoring group includes a delay circuit 18, triggered by certain actions of the sequencer, and which feeds an end-of-delay signal to the status register 161 of interface circuit 16.

Figure 2:
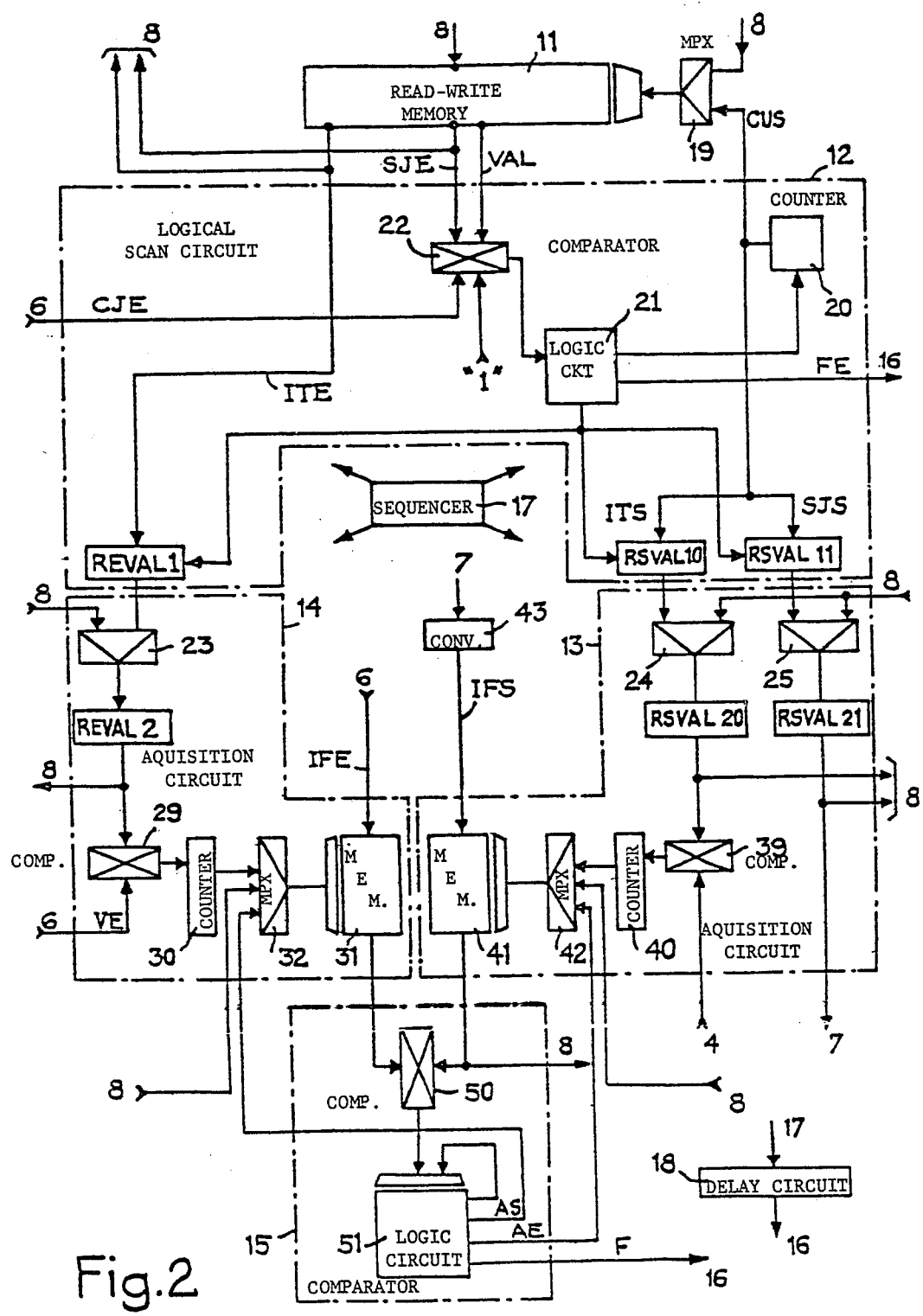
FIG. 2 is a detailed representation of an illustrative monitoring group according to the invention.

FIG. 2 is a considerably more detailed representation of an illustrative monitoring group. For a write operation executed by microprocessor 8, the read-write memory 11 is fed with the incoming channel addresses and is addressed for writing via a multiplexer 19 by the outgoing channel addresses, such that memory 11 stores the address of an incoming channel plus a validation bit VAL in the location indicated by the address of the outgoing channel to which it is connected. Memory access by the microprocessor has priority over all other operations.

For a read operation by the logical scan circuit 12, the memory is addressed for reading via multiplexer 19 by signal CUS produced by a counter 20. Signal CUS assumes, one after the other, the values of the addresses of the outgoing channels relating to the group concerned, under the control of a logic circuit 21, which controls the scanning of memory 11. At the end of the scan operation, i.e. when all the memory lines have been read, signal CUS is O and the microprocessor is informed of this by means signal FE produced by circuit 21, via the status register 162 of circuit 16.

The outputs of memory 11 produce the address of one incoming trunk SJE and on this trunk the address of a channel ITE, and also the validation bit VAL indicating when a logical "1" that a path is established between this incoming channel and an outgoing channel.

A comparator 22 simultaneously checks that the path has been established by comparing bit VAL with a logical "1" and compares address SJE with address CJE of the incoming trunk used by the path to be tested.

If the result of the comparison performed by comparator 22 is negative, the control circuit 21 increments counter 20 by one and memory scanning continues until the result of the comparison is positive, or until the end of memory scanning.

On the other hand, if the result of the comparison performed by comparator 22 is a positive, circuit 21 orders memorization of the outgoing trunk address SJS in a register RSVAL 11, the memorization of the address of channel ITS in a register RSVAL 10 (SJS and ITS being contained in CUS), and the memorization of the address of the incoming channel ITE obtained from memory 11 in a register REVAL 1.

When sequencer 17 orders sample acquisition, addresses SJS, ITS and ITE are stored in intermediate registers RSVAL 20, RSVAL 21 and REVAL 2 respectively, thereby enabling the scan of memory 11 to continue, i.e. the search for another established path to be tested, whilst the monitoring procedure (sample acquisition and comparison) continues for the path whose coordinates are in these intermediate registers.

Once all the correspondence memories contained in the monitoring groups have been scanned, i.e. once microprocessor 8 has received the end-of-scan signals FE from all the check groups, the microprocessor increments counter 61 in order to test another path using another incoming trunk.

Thus, all the paths established in the switching network are tested, incoming trunk, by incoming trunk when operating in the autonomous mode.

In order to perform the sample acquisition operations, the contents of register REVAL 2 are, by means of a comparator 29, with the incoming address channel VE produced by synchronization and multiplexing circuit 6, and the contents of register RSVAL 20 are compared by a comparator 39 with the signal obtained from the local clock 4.

Each time that the outcome of the first comparison is positive, it results in the acquisition of an incoming data sample which is written into a read-write memory 31. This acquisition is followed by incrementing a 2-bit counter 30 whose output addresses, via a multiplexer 32, the read-write memory 31 for writing, the input of this memory being fed with the incoming data signal IFE of the incoming trunk selected by circuit 6.

Each time that the outcome of the second comparison is positive, it results in the acquisition of an outgoing data sample which is written into a read-write memory 41. This acquisition is followed by incrementing a 2-bit counter 40 by one, the output of this counter addressing, via a multiplexer 42, the read-write memory 41 for writing, the input of this memory being fed with the outgoing data signal IFS corresponding to the outgoing trunk selected by synchronizing and multiplexing circuit 7, by means of the address of the selected outgoing trunk JSS obtained from RSVAL 21, and converted into parallel form by means of the serial-to-parallel converter 43.

By means of these sample acquisition devices, four successive incoming and outgoing samples of the same channel are recorded in the read-write memories 31 and 41 respectively. These samples are compared by means of the comparator circuit 15, which comprises a comparator 50 fed with the signals obtained from memories 31 and 41 and whose output addresses a programmable memory.

As soon as the samples have been acquired, a comparison logic circuit 51 is activated. This microprogrammed comparison logic circuit compares the samples stored in memories 31 and 41, in pairs, until two successive pairs of equal samples are detected. It executes all the possible combinations as a function of the various sample transit times through the switching network. These combinations are obtained by means of read addressing signals AS, which address memory 31, via multiplexer 32, and addressing signals AE which address memory 41, via multiplexer 42.

If two pairs of equal samples are not found after a first test, a second test, is performed. This second test performed immediately after the first, consists in acquiring new samples on the same channels.

If this second test is also negative, the path is declared defective by the comparison logic, circuit 51 which signals this fact to microprocessor 8 by means of signal F, via the status register 163 of interface 16. The monitoring group concerned waits for microprocessor 8 to read the coordinates of the defective path in registers RSVAL 21, RSVAL 20 and REVAL 2, before continuing with path checking.

A delay circuit 18 is triggered each time that counter 20 of the logic circuit 12 scanning the correspondence memory 11 is incremented in the autonomous mode, and by any acquisition and comparison order from the microprocessor in the on-demand mode. The end of the delay period is signalled to the microprocessor, via status register 16.

When microprocessor 8 reads the contents of status register 16, if the end of the delay is signalled whilst neither the end of scanning nor a defective path is signalled, the group concerned is blocked. The microprocessor is, thus, warned of any blocking in the monitoring device by means of delay circuit 18.

The self-test circuit 10 tests the logic of each monitoring group either periodically, or when ordered by the processor. The self-test consists in creating a fictitious path simulating a network path and carrying real data.

For this purpose, the outgoing trunks are applied to the input of circuit 6 via a group of multiplexers 44 after shaping by circuit 10, to simulate the data obtained from the incoming trunks.

During shaping, the data is kept identical in order to test the ability of the circuit to detect that a path is not defective, or the signal is inverted if it is required to test the ability of the circuit to detect that a path is defective.

When operation of the device is requested by the processor, it sends via the microprocessor the coordinates of the path to be tested to registers RSVAL 21, RSVAL 20 and REVAL 2, via multiplexers 23, 24 and 25, respectively, if it requires the testing of a path.

If it is required to test the presence of the frame alignment code or the free channel code of an outgoing trunk, the microprocessor reads the acquired samples in the read-write memory 41 and the comparison with appropriate codes is executed by software. If the device is required to test the presence of the alignment code on an incoming trunk, the microprocessor attempts to synchronize the trunk to be tested.

In order to perform these tests, the microprocessor temporarily interrupts autonomous checking.

The monitoring device in accordance with the invention has all the advantages of known devices, i.e. it can be used for all switching networks whatever their nature and technology. In addition, it tests all paths during operation and over the whole length of the path within the switching network, and has the further advantage of a monitoring time which is both short (less than 6 seconds for a capacity of up to 2048 PCM trunks) and constant, independent of the network capacity, because of the simultaneous operation of several check groups.

In order to use the latter advantage to the full, the monitoring device is of modular construction, enabling it to follow network extension or reduction easily.

One skilled in the art may make various changes and modifications to the layout of parts shown without departing from the spirit and scope of the invention.

We claim:

1. A check device for time-division switching networks establishing communication paths between incoming trunks and outgoing trunks, a processor being provided to produce correspondence data determining the relationship of an incoming trunk channel with an outgoing trunk channel, characterized by the fact that it possesses N check groups, a microprocessor connected to the processor via data queues and under the control of which the N check groups operate simultaneously, a synchronization and multiplexing circuit which connects each check group to all the incoming trunks, and a multiplexing circuit which connects each check group to those outgoing trunks assigned to this group.

2. A check device for a time-division switching network in accordance with claim 1, characterized by the fact that the synchronization and multiplexing circuit possesses several synchronization groups, each possessing a multiplexer whose inputs are fed with some of the incoming trunks, whose control input is connected to a register loaded by the microprocessor, and whose output is connected to a synchronization unit whose output produces a synchronized incoming trunk, the various synchronization groups being totally independent, and by the fact that the synchronization and multiplexing circuit also possesses a multiplexer whose inputs are connected to the outputs of the synchronization groups and whose output feeds a synchronized incoming trunk to the check groups, and a register which is connected to the control input of the multiplexer and which is loaded by the microprocessor such that the synchronized incoming trunk fed to the check groups is obtained in turn in a cyclic manner from each of the synchronization groups, the groups whose outputs are not selected being engaged in synchronizing the following trunks such that a synchronized trunk is always available on the output of the synchronization and multiplexing circuit without any waiting.

3. A check device for a time-division switching network in accordance with claim 2, in which a check group possesses a correspondence memory and a logic for scanning this memory and possessing an addressing counter for reading the memory, characterized by the fact that the correspondence memory of a group contains only those correspondence data relating to the outgoing trunks assigned to this group.

4. A check device for a time-division switching network in accordance with claim 3, in which the check group possesses an incoming data acquisition device consisting of a comparator comparing the incoming channel address obtained from the correspondence memory with the incoming channel address obtained from the synchronization and multiplexing circuit, a 2-bit counter connected to the comparator output and a 4-word read-write memory addressed by the counter for reading and an outgoing data acquisition device which consists of a comparator comparing the outgoing channel address obtained from the counter addressing the correspondence memory for reading with the signal obtained from the local clock, a 2-bit counter which is connected to the comparator output and a 4-word read-write memory addressed by the counter for writing, characterized by the fact that the incoming data acquisition device possesses an intermediate register for storing, before feeding to the comparator concerned, the incoming channel address obtained from the correspondence memory, and by the fact that the outgoing data acquisition device possesses two intermediate registers, the first storing the outgoing channel address before feeding to the comparator concerned, and the second storing the outgoing trunk address before being fed to the multiplexing circuit, these two addresses being obtained from the addressing counter reading the correspondence memory, the presence of these intermediate registers allowing the continuation of memory scanning during execution of the remainder of the processing.

5. A check device for a time-division switching network in accordance with claim 3, characterized by the fact that each check group possesses a delay circuit triggered by each incrementation of the addressing counter for reading the correspondence memory and whose end-of-delay is recorded in a register.

6. A check device for a time-division switching network in accordance with claim 1, characterized by the fact that it possesses between the N check groups and the microprocessor an interface circuit consisting of three N-bit status registers indicating respectively for each group the end of scanning of the correspondence memory, the end of delay and the detection of a defective path.

7. A check device for a time-division switching network in accordance with claim 1, possessing a self-test circuit which reinjects the outgoing data obtained on the "output" side of the check device as fictive incoming data on the "input" side of the check device, characterized by the fact that it possesses a shaping circuit whose inputs are connected to the output of the multiplexing circuit, whose outputs are connected to the inputs of the synchronization and multiplexing circuit via a group of multiplexers whose other inputs are connected to the incoming trunks and, when ordered by the microprocessor, which produces data either identical with those it has received or inverted.

8. An improved monitoring device for a time-division telecommunications network which establishes communication paths between incoming trunks and outgoing trunks, said device including processor for producing correspondence data determining the relationship of an incoming trunk channel with an outgoing trunk channel, wherein the improvement comprises:
N monitoring groups connected to said incoming and outgoing trunks;
a microprocessor connected to said processor via data queues, under the control of said micro processor said N monitoring groups operate simultaneously;
a synchronization and multiplexing circuit for connecting each monitoring group to all of said incoming trunks; and,
a multiplexing circuit for connecting each monitoring group to those outgoing trunks assigned to said group.

9. A monitoring device in accordance with claim 8 wherein said synchronization and multiplexing circuit comprises:
a plurality of synchronization groups, each including a multiplexer whose inputs are fed with selected ones of the incoming trunks, the control input thereof being connected to a register loaded by said microprocessor, the output thereof being connected to a synchronization unit whose output produces a synchronized incoming trunk, each of said synchronization groups being totally independent;
a multiplexer whose inputs are connected to the outputs of said synchronization groups and whose output feeds a synchronized incoming trunk to the monitoring groups; and
a register connected to the control input of said multiplexer and loaded by said microprocessor such that the synchronized incoming trunk fed to the monitoring groups is selected in turn in a cyclic manner from each of said synchronization groups, the groups whose outputs are not selected being engaged in synchronizing the subsequent trunks such that a synchronized trunk is always available on the output of the synchronization and multiplexing circuit without any waiting.

10. A monitoring device in accordance with claim 9 wherein each monitoring group includes:
a correspondence memory;
a logic circuit connected to said memory for scanning the memory; and
an addressing counter for reading said memory, the correspondence memory of a given group containing only that correspondence data relating to the outgoing trunks assigned to this group.

11. A monitoring device in accordance with claim 10 wherein each monitoring group includes:
an incoming data acquisition circuit comprising a comparator for comparing the incoming channel address obtained from said correspondence memory with the incoming channel address obtained from said synchronization and multiplexing circuit;
a binary counter connected to the comparator output; and
a read-write memory addressed by the counter for reading and an outgoing data acquisition device which comprises:
a comparator for comparing the outgoing channel address obtained from the counter addressing said correspondence memory for reading with the signal obtained from the local clock; a binary counter which is connected to the comparator output; and a read-write memory addressed by the counter for writing, said incoming data acquisition device further comprising an intermediate register for storing, before feeding to the comparator concerned, the incoming channel address obtained from the correspondence memory, said outgoing data acquisition device further comprising at least two intermediate registers, the first storing the outgoing channel address before feeding to the comparator concerned, and the second storing the outgoing trunk address before being fed to the multiplexing circuit, these two addresses being obtained from the addressing counter reading the correspondence memory, said intermediate registers allowing the continuation of memory scanning during execution of the remainder of the processing.

12. A monitoring device in accordance with claim 10 wherein monitoring further comprises:
a delay circuit triggered by each incrementation of said addressing counter for reading the correspondence memory, the end-of-delay signal therefrom being recorded in a register.

13. A monitoring device for a time-division switching network in accordance with claim 8 or 10 or 12, further comprising, between said N monitoring groups and said microprocessor, an interface circuit comprising three N-bit status registers indicating, for each group, the end of scanning of said correspondence memory, the end of delay, and the detection of a defective path in said network.

14. A monitoring device in accordance with claim 8, further including a self-test circuit which reinjects the outgoing data obtained on the "output" side of said monitoring device as fictious incoming data on the "input" side of said monitoring device, said test circuit including a shaping circuit whose inputs are connected to the output of said multiplexing circuit, whose outputs are connected to the inputs of said synchronization and multiplexing circuit, via a group of multiplexers whose other inputs are connected to the incoming trunks, said test circuit when ordered by said microprocessor, producing data either identical with that it has received or an inverted version thereof.

* * * * *